Sept. 15, 1925.
J. R. CRISP
LEVEL
Filed May 10, 1923
1,553,990
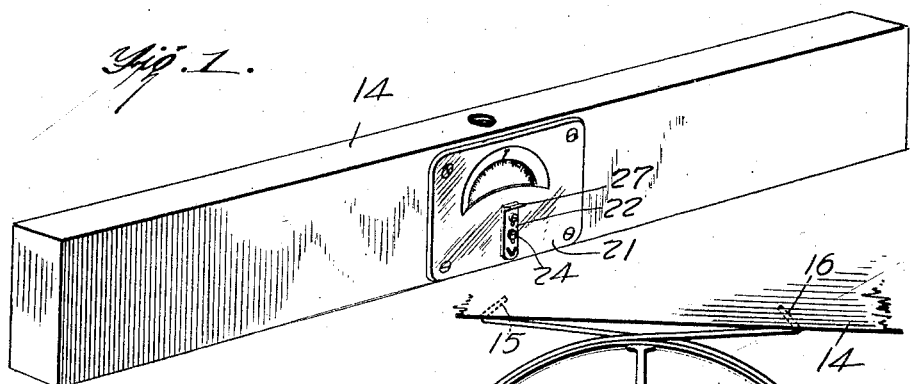
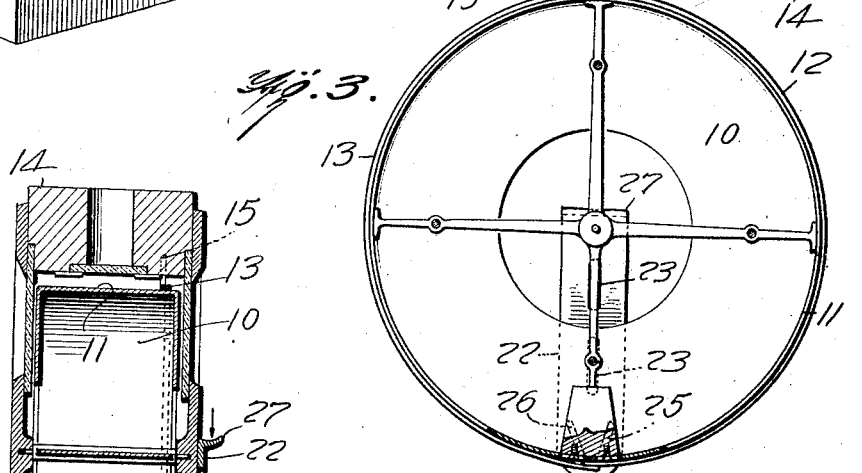
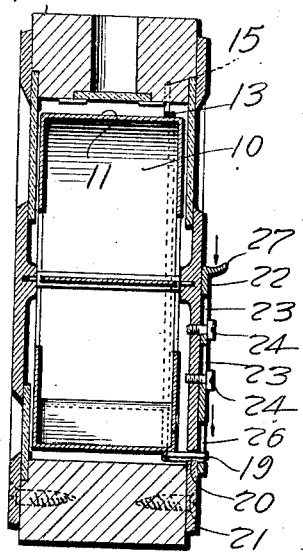
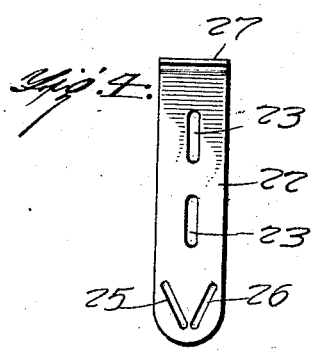
Inventor
JOSEPH R. CRISP,
By
Attorney Patented Sept. 15, 1925.

1,553,990

UNITED STATES PATENT OFFICE.

JOSEPH ROSSEL CRISP, OF ALMOND, NORTH CAROLINA, ASSIGNOR TO PRECISION INSTRUMENT COMPANY, A CORPORATION OF NORTH CAROLINA.

LEVEL.

Application filed May 10, 1923. Serial No. 638,023.

*To all whom it may concern:*

Be it known that JOSEPH R. CRISP, a citizen of the United States, residing at Almond, in the county of Swain and State of North Carolina, has invented certain new and useful Improvements in Levels; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to levels and has for an object to provide means for locking the rotating parts of a level indicating inclinations so that the inclination, once registered upon the instrument, may be maintained for consultation as, for instance, when the inclination is taken at a relatively inaccessible point and the parts locked, the instrument as a whole may be removed from the position and the registered inclination examined at a convenient place.

A further object of the invention is to provide an improved type of band brake encircling the rotating part with improved means exterior of the level body for manipulating the band brake.

With these and other objects in view, the invention comprises certain novel parts, elements, units, combinations, interactions and mechanical movements, as disclosed in the drawings, together with mechanical equivalents thereof, as will be hereinafter more fully described and claimed.

In the drawings:

Figure 1 is a perspective view of the level, showing the manual device for actuating the brake;

Figure 2 is a transverse sectional view diametrically through the rotating part, showing the brake band in position;

Figure 3 is a view of the rotating part with the housing partially removed showing the rotating part embraced by the band brake;

Figure 4 is a view in side elevation of the manual operating device;

Figure 5 is a perspective view of a fragment of the overlapping ends of the band brake.

Like characters of reference indicate corresponding parts throughout the several views.

The locking mechanism disclosed in the present application is adapted to be used with levels or inclinometers of various styles and types, but is more especially intended and adapted to coact with the level disclosed in co-pending application, Serial #525,989, filed December 30, 1921.

In that application, a specific type of rotating member is disclosed, which is indicated herein as an entirety at 10, but the present invention including none of the features of that invention will simply refer to the part as an organized structure. This rotating part includes the circumferential band, 11, which may be secured to or upon the frame of the rotating part in any approved manner and the specific form of adjustment is immaterial to the present invention.

About this circumferential band, 11, the band brake is placed. This band brake may assume various mechanical and structural forms and is here shown as comprising two sections of wire, 12 and 13. This brake, if constructed of the two sections of wire, as shown, will be secured to the body or frame of the level proper, indicated at 14, in any approved manner, as by bending the extremities of said sections at 15 and 16, respectively, and inserting into the structure of the frame, which ordinarily is wood.

The sections of wire then extend slightly more than half way about the band, 11, and cross, as indicated at 17 in Figure 5, with the ends turned outwardly at 18 and 19, respectively and extend through a slot, 20, in the front plate, 21, with a manual keeper or lock member, 22, arranged to slide by the provision of slots 23, through which screws, 24, extend, and by the use of which tension may be exerted upon the latch to make it move more or less easily as occasion may make desirable. The latch, 22, is provided with slots, 25 and 26, through which the ends, 18 and 19, of the brake sections, respectively, extend, as indicated more particularly at Figure 2. These slots, 25 and 26, together form a substantially V-shape, so that as the keeper is moved longitudinally upon the screws, 24, the extremities, 18 and 19, are drawn together or moved apart. For the purpose of moving this keeper, a ledge, 27, is provided. It will be obvious that when the extremities, 18 and 19, are separated it serves to tighten the band brake upon the band 11 and that this separating the points is brought about by moving the keeper, 22, in the direction indicated by the arrow at Figure 2 and that when moved in the opposite direction the extremities, 18 and 19, will be drawn together, releasing the tension of the brake upon the band.

In an instrument of this type, accuracy of adjustment and journaling is essential and it is, therefore, highly important that the band brake shall engage the rotating member uniformly at practically all points throughout its circumference, so that its adjustment and journaling will not be disturbed in the application of the brake to the rotating part. It is, therefore, desirable, that this band brake shall encompass substantially the entire circumference of this rotating member and shall clamp with uniform pressure upon all points thereof simultaneously. The present structure is provided especially for this purpose of uniformity of application of the braking stress and for maintaining the rotating member accurately in its journaled adjustment.

It is obvious that the device may be raised to such heights or inserted into places where it is impossible or impractical to see the inclination registered upon the dial and that when so positioned and the inclination of the brace or other part secured by the rotating of the parts to the necessary inclination, such position may be maintained by locking the parts and the level then withdrawn for examination, the inclination being read therefrom as easily and accurately as though the level were visible at the time it was applied to the brace or other member.

What I claim is:

1. The combination with a level providing a housing, comprising a rotatable cylindrical drum mounted in said housing, of a brake band surrounding the periphery of the drum and having its ends bent to extend outwardly through a slot in the housing, and a keeper slidably mounted upon the exterior of the housing and having inclined cam surfaces engaging and adapted to actuate the extended ends of the brake upon movement of said keeper whereby the band may be caused to contract about and engage said drum.

2. The combination with a level providing a housing comprising a rotatable cylindrical drum mounted in said housing, of a brake band surrounding the periphery of the drum having its ends bent to extend outwardly through a slot in the housing, and a keeper slidably mounted upon the exterior of the housing and having inclined cam surfaces engaging and adapted to separate the extended ends of the brake upon movement of said keeper whereby the band may be caused to contract about and engage said drum.

3. The combination with a level providing a housing comprising a rotating part having a cylindrical drum of a brake band surrounding the cylindrical drum and having its ends crossed and turned to extend outwardly through the structure of the level, a keeper slidably mounted upon the exterior of the housing and provided with cam slots engaging said outwardly turned ends, adapted to move said extended ends towards and away from each other by the sliding movement of said keeper and at their limit of movement away from each other to engage said cylindrical drum uniformly upon its entire circular extent.

In testimony whereof he hereunto affixes his signature.

JOSEPH ROSSEL CRISP.